(12) United States Patent
Antoni et al.

(10) Patent No.: US 8,607,650 B2
(45) Date of Patent: Dec. 17, 2013

(54) TORQUE SENSOR ARRANGEMENT WITH ROTATIONAL ANGLE INDEX DETECTION

(75) Inventors: Henrik Antoni, Freigericht (DE); Klaus Rink, Rodenbach (DE); Wolfgang Fritz, Gieβen (DE)

(73) Assignee: Continental Teves AG & Co. oHG (DE)

( * ) Notice: Subject to any disclaimer, the term of this patent is extended or adjusted under 35 U.S.C. 154(b) by 233 days.

(21) Appl. No.: 13/003,419

(22) PCT Filed: Jul. 14, 2009

(86) PCT No.: PCT/EP2009/059005
§ 371 (c)(1),
(2), (4) Date: Mar. 22, 2011

(87) PCT Pub. No.: WO2010/007068
PCT Pub. Date: Jan. 21, 2010

(65) Prior Publication Data
US 2011/0167920 A1     Jul. 14, 2011

(30) Foreign Application Priority Data

Jul. 14, 2008    (DE) .......................... 10 2008 032 866

(51) Int. Cl.
*G01L 3/02*    (2006.01)
(52) U.S. Cl.
USPC ...................................... 73/862.333; 73/760
(58) Field of Classification Search
USPC ............................... 73/760, 862.331–862.333
See application file for complete search history.

(56) References Cited

U.S. PATENT DOCUMENTS

| | | | |
|---|---|---|---|
| 5,027,663 A * | 7/1991 | Frister et al. | 73/862.331 |
| 5,719,494 A | 2/1998 | Dettmann et al. | |
| 6,026,925 A * | 2/2000 | Nagao et al. | 180/444 |
| 6,301,975 B1 * | 10/2001 | Chikaraishi | 73/862.331 |
| 6,427,307 B1 * | 8/2002 | Al-Rawi | 29/407.05 |
| 6,854,343 B2 * | 2/2005 | Bachnak et al. | 73/862.334 |
| 7,076,395 B2 * | 7/2006 | Ito | 702/151 |
| 7,174,795 B2 * | 2/2007 | Feng et al. | 73/862.332 |
| 7,406,884 B2 | 8/2008 | Jerems et al. | |
| 7,454,986 B2 * | 11/2008 | Kwasny et al. | 73/862.08 |
| 2006/0037410 A1 | 2/2006 | Gierut | |
| 2006/0123903 A1 | 6/2006 | Gandel et al. | |
| 2010/0005909 A1 * | 1/2010 | Antoni et al. | 73/862.325 |

FOREIGN PATENT DOCUMENTS

| | | |
|---|---|---|
| DE | 4436876 A1 | 4/1996 |
| WO | WO 02/071019 A1 | 9/2002 |
| WO | WO 2005/068962 | 7/2005 |
| WO | WO 2006/035284 A1 | 4/2006 |

* cited by examiner

*Primary Examiner* — Max Noori
(74) *Attorney, Agent, or Firm* — RatnerPrestia

(57) ABSTRACT

Sensor arrangement including a torque sensor for measuring the torque acting on a first shaft, the sensor arrangement having a rotational angle index unit which is designed in such a manner that it can detect and/or identify the angular position of the first shaft with respect to a defined rotational angle and/or defined rotational angle range.

9 Claims, 9 Drawing Sheets

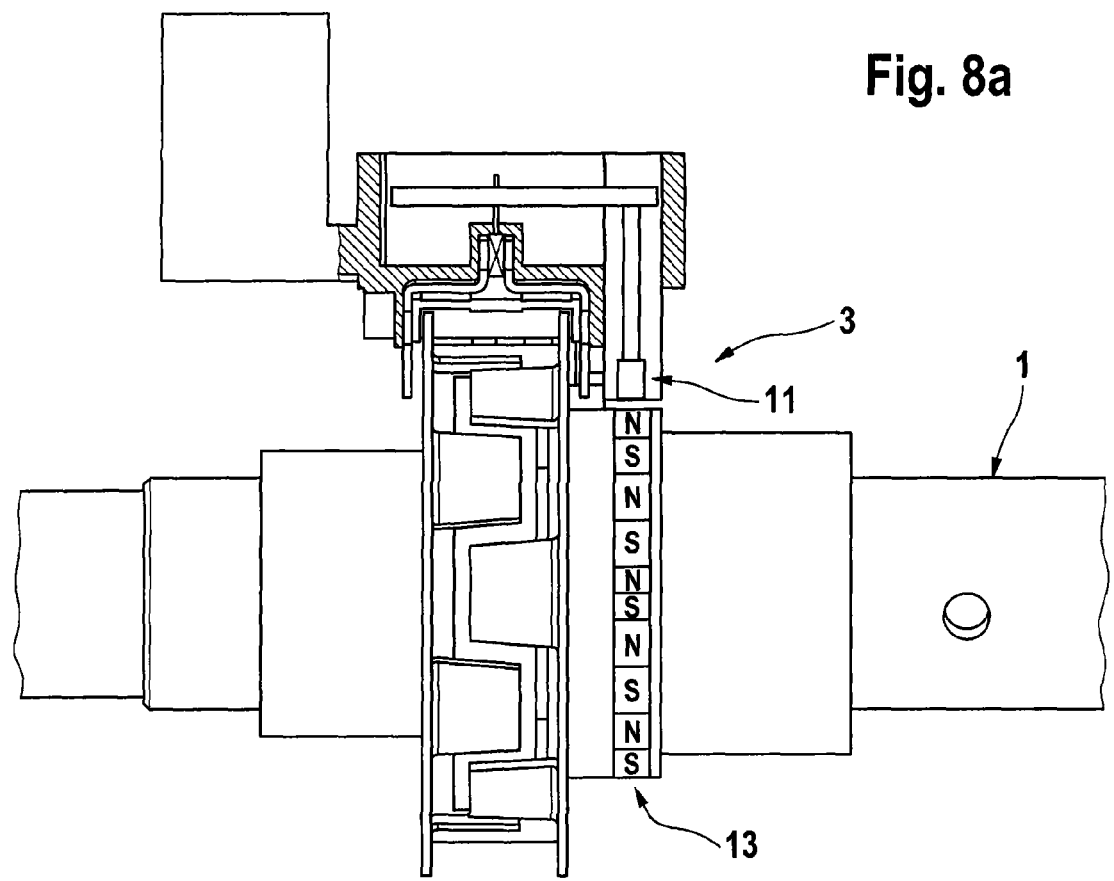
Fig. 8a
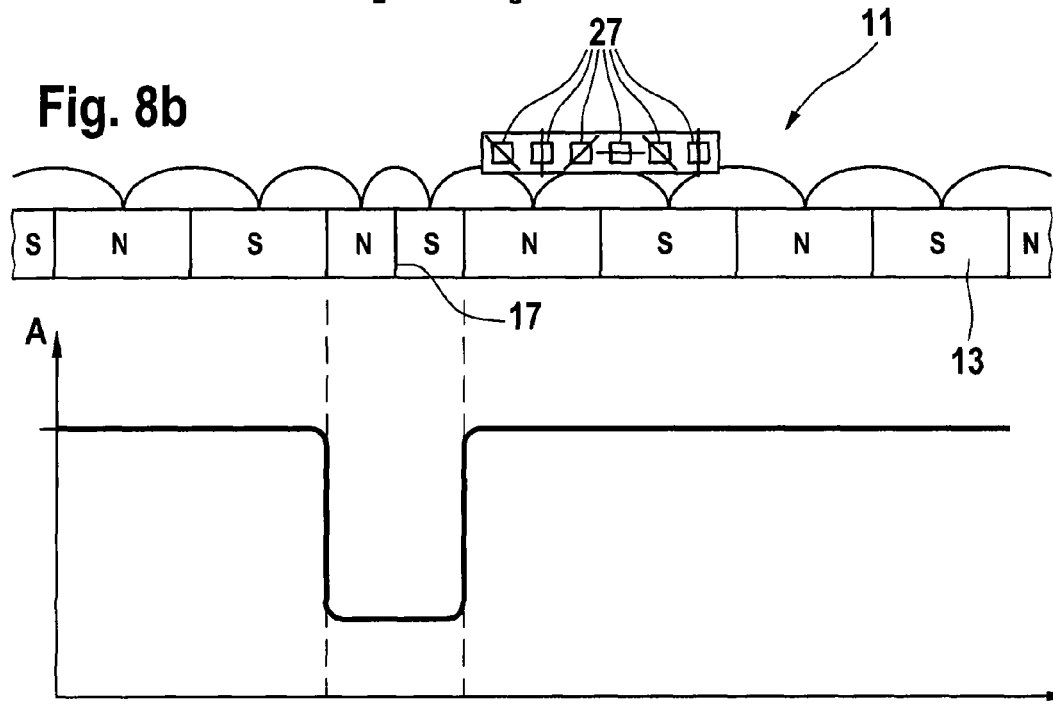
Fig. 8b
Fig. 8c

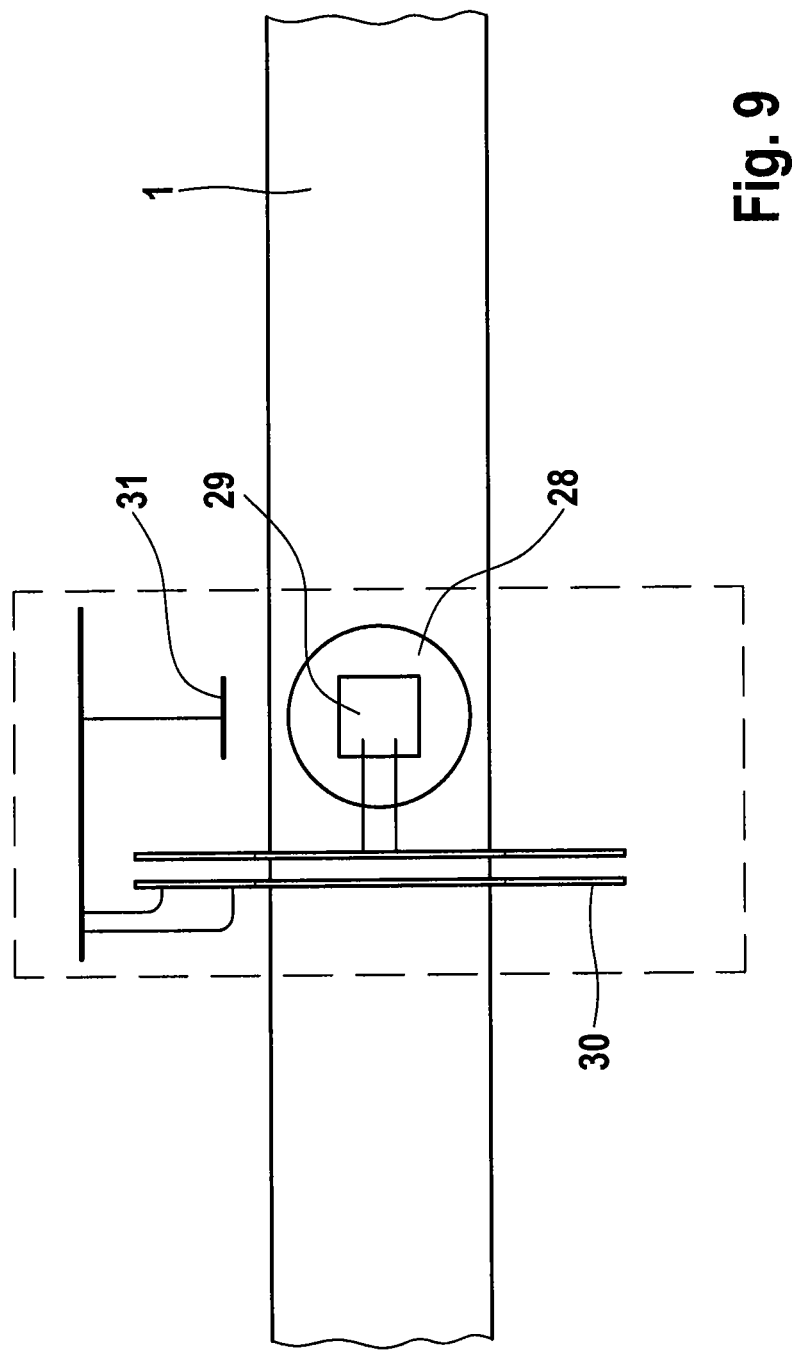

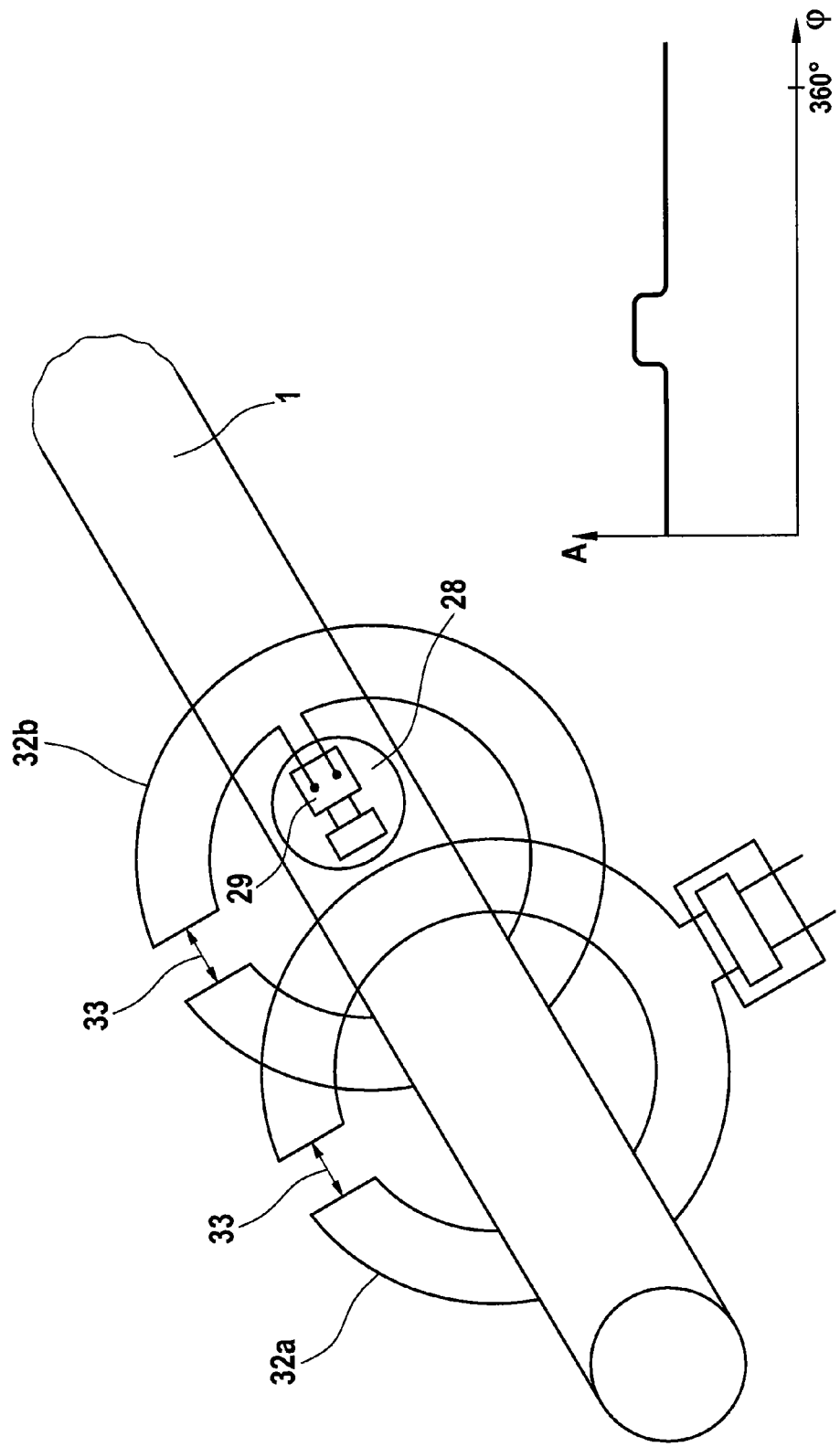

TORQUE SENSOR ARRANGEMENT WITH ROTATIONAL ANGLE INDEX DETECTION

CROSS REFERENCE TO RELATED APPLICATIONS

This application is the U.S. national phase application of PCT International Patent Application No. PCT/EP2009/059005, filed Jul. 14, 2009, which claims priority to German Patent Application No. 10 2008 032 866.9, filed Jul. 14, 2008, the content of such applications being incorporated by reference herein.

FIELD OF THE INVENTION

The invention relates to a sensor arrangement and to the use of the sensor arrangement in motor vehicles.

BACKGROUND OF THE INVENTION

The invention relates to the object of proposing a functionally expanded sensor arrangement based on a torque sensor.

SUMMARY OF THE INVENTION

This object is achieved, according to aspects of the invention, by a sensor arrangement comprising a torque sensor for measuring the torque acting on a first shaft, wherein the sensor arrangement has a rotational angle index unit which is designed in such a manner that it can detect and/or identify the angular position of the first shaft with respect to a defined rotational angle and/or defined rotational angle range.

The torque sensor and the rotational angle index unit are preferably integrated in a common subassembly. This makes it possible to reduce production costs and installation costs. The sensor elements and/or electronic components of the torque sensor and of the rotational angle index unit are arranged, in particular, on a common printed circuit board and/or on a common chip.

The torque sensor and the rotational angle index unit are preferably designed in such a manner that they use physically different sensor-based detection principles in comparison with one another. The torque sensor uses, in particular, a magnetic encoder and at least one magnetic field sensor element and the rotational angle index unit uses an optical encoder and an optical sensor element.

It is preferred for the torque sensor to comprise a first shaft section and a second shaft section of the first shaft, both of which sections are connected to one another using a torsion bar and are designed and arranged such that they are rotatable with respect to one another, a magnetic encoder being arranged on the first shaft section and two stator elements which are assigned to this encoder and have respective projecting fingers being arranged on the second shaft section. In particular, the stator elements each comprise a soft magnetic ring element having fingers which project axially with respect to the first shaft and are particularly preferably essentially trapezoidal, the fingers of the two stator elements contactlessly engaging in one another, and at least one magnetic field sensor element being jointly assigned to the stator elements, which magnetic field sensor element is used to directly or indirectly detect the relative angle of rotation between the first shaft section and the second shaft section, the torque acting on the first shaft being inferred from said angle. Such a torque sensor has proven to be relatively precise and reliable. This design of trapezoidal fingers has proven to be particularly suitable for relatively precise conduction of the magnetic field.

The two shaft sections are expediently each in the form of sleeves which are fastened to the first shaft or to the torsion bar.

Alternatively, the torque sensor preferably does not comprise a torsion bar and is designed in such a manner that the torque is detected on an essentially rigid shaft, the torque sensor having at least one of the following sensor elements
a strain gage,
a piezoelectric and/or piezoresistive sensor element,
a magnetostrictive sensor element,
a sensor element based on the use of surface waves,
this at least one sensor element being directly or indirectly connected to the first shaft and/or being designed and arranged in such a manner that it can detect a torque acting on the first shaft. The sensor element is arranged, in particular, on a sensor carrier module which enables simplified mounting on the shaft, this sensor carrier module being arranged in a recess in the shaft or being in the form of a film which is arranged on the shaft or applied to the shaft. The sensor carrier module is particularly preferably designed and fitted into the shaft and/or connected to the latter in such a manner that the sensor carrier module is concomitantly deflected by the torque acting on the shaft and/or a mechanical stress present in the shaft is transferred to the sensor carrier module and the at least one sensor element detects this deflection and/or mechanical stress. The sensor carrier module is very particularly preferably designed in such a manner that it wirelessly receives its electrical supply energy and wirelessly sends or transmits information. For this purpose, the sensor carrier module has an RFID (radio-frequency identification) chip, for example.

The rotational angle index unit preferably has an index encoder element and an index sensor element which is assigned to the latter, the index encoder element or the index sensor element being directly or indirectly connected to the first shaft and rotating with the latter and the corresponding index sensor element or index encoder element being arranged in a stationary, contactless manner with respect to the first shaft. The index encoder element is, in particular, magnetically or optically detectable and/or electrically conductive, the index sensor element comprising at least one magnetic field sensor element and/or a coil or an optical sensor element. The index encoder element is particularly preferably in the form of a magnetically and/or electrically conductive disk or disk segment which is arranged essentially perpendicular to the axis of the first shaft. Alternatively, the index encoder element is particularly preferably in the form of a lug or lug element or finger or stamped portion or other coding in a body, this body itself and/or the index coding being magnetically or optically detectable. Alternatively, the index encoder element is preferably in the form of a magnetically conductive perforated disk or disk with at least one recess.

The term "index sensor element" is preferably understood as meaning the expression "first sensor element" and/or the expression "first magnetic field sensor element".

A magnetic field sensor element is understood as meaning a magnetoelectrical transducer element, preferably a Hall element or a magnetoresistive sensor element. Such a magnetic field sensor element has, in particular, an integrated electronic signal processing circuit.

The index encoder element is preferably fastened to the first shaft or to one of the shaft sections of the torque sensor using a carrier element. In particular, this carrier element is essentially annular.

An index encoder element is preferably understood as meaning an index segment, in particular in terms of detecting this index segment with respect to a relative angle of rotation between the index segment and index sensor element or magnetic field sensor element.

The detection or non-detection of the index encoder element by the index sensor element preferably makes it possible to determine whether the respective relative angle of rotation between the first shaft and a stationary reference point or the index sensor element at a defined point in time is within a defined index range or a defined overlapping area.

It is expedient for the index encoder element to be in the form of a magnetic encoder and for the rotational angle index unit to have two magnetically conductive baffles which supply the magnetic field generated or modulated by the index encoder element to the index sensor element and for the index sensor element to be able to thus detect the index encoder element, in particular within a defined overlapping area, with respect to the detectable length of the index encoder element and the length of the baffles with respect to the respective circumferential line. The baffles make it possible to use a relatively weak magnet as the index element, as a result of which other sensor modules in the sensor arrangement which operate according to a magnetic operational principle, for example an optional torque sensor module described further below, are disrupted as little as possible.

It is preferred for the index encoder element to be arranged on a magnetic encoder of a rotational angle sensor module and, in particular, to be directly or indirectly coded in the one or more magnetic tracks of this encoder. Alternatively, the sensor arrangement preferably does not have a rotational angle sensor module with this encoder.

The sensor arrangement preferably has a torque sensor comprising at least one alternately magnetized second encoder which is assigned two stator elements with axially projecting fingers which engage in one another, the stator elements conducting the magnetic field of the second encoder to a second magnetic field sensor element, in particular using two additional metal collecting sheets, in order to detect the torque between the shaft sections or the torque acting on the shaft.

The index encoder element is preferably arranged on a collar of one of the stator elements of the torque sensor and/or on a collar of an additional encoder. This makes it possible to fasten the index encoder element to the first shaft and/or to one of the shaft sections in a relatively simple and cost-effective manner.

It is expedient for the rotational angle index unit to comprise a first sensor element, in particular a first magnetic field sensor element, and for the torque sensor to comprise a second magnetic field sensor element. The first and second magnetic field sensor elements and at least one signal processing circuit are expediently arranged on a common printed circuit board.

It is preferred for the baffles of the rotational angle index unit to have areas of different sizes with respect to an area perpendicular to the first shaft, the baffle adjacent to the torque sensor, in particular, having a larger area than the other baffle, as a result of which the torque sensor is shielded from the magnetic field of the magnetic index encoder element.

It is preferred for the stator elements of the torque sensor to be connected to one another using a common connecting element, in particular made of injection-molded plastic. This sets the relative orientation of the two stator elements with respect to one another in a relatively precise and fixed manner.

The sensor arrangement preferably comprises a common housing.

The rotational angle index unit is preferably designed according to one of the following detection principles:

preferably measurement using a forked light barrier:

An optical lug or mark is directly or indirectly fastened to the first shaft as an index encoder element and rotates with the shaft. An optical transmitting unit which is, in particular, integrated in sensor electronics generates an electromagnetic wave, alternatively visible or invisible light for example, and transmits this in the direction of a light-sensitive sensor unit. The index encoder element is detected by the amount of light on the receiving unit. This principle is particularly advantageous in conjunction with a torque sensor since the physical measurement principles are different;

preferably measurement using an MR length sensor:

A magnetic encoder which is magnetized with alternating poles is applied to the first shaft. A magnetoresistive length sensor which is designed for operation with a defined pole length is used as the reading unit. At the index location or upon detection of the index segment, the pole lengths of the latter are different from the remaining angle range, such that a change in amplitude of the bridge signal of the length sensor is measured;

expediently measurement using an MR gradient sensor:

Two magnetoresistive structures at different locations are applied to a sensor chip, the individual resistors of said structures each being electrically connected in series with one another in pairs. The sensor element may then detect a magnetic flag or magnetic index which is connected to the first shaft as an index encoder element, in which case it is possible to compensate for magnetic interference fields. Such a sensor design is illustrated, for example, in the document DE 4436876, which is incorporated by reference;

preferably measurement using an eddy current sensor:

A resonant circuit consisting of a coil which is fed with alternating current. If a measurement flag as an index encoder element is then moved in front of the coil, an eddy current is induced in the flag, which current generates, according to Faraday's law of induction, an electromagnetic field which counteracts the field of the field coil and changes the coil impedance;

expediently measurement using RFID:

An antenna structure is fitted to the first shaft as an inductive load (tag) and can be brought to resonance with the transceiving unit. If the tag is now moved past the transceiving unit, the circuit is brought to resonance. The combination of a sensor with wireless RFID-based signal transmission and the index sensor on the same basis is particularly advantageous since the components such as the antenna structure and the resonant circuit can be implemented using the same manufacturing method. The sensors are distinguished on the basis of the different signals; digital coding can thus be used to transmit the torque information, the index sensing being able to be clearly detected using the change in amplitude of the carrier-frequency;

preferably measurement using an inductive proximity switch:

The inductive proximity switch operates in a similar manner to the eddy current sensor—a coil which is fed with alternating current and has a ferrite core generates an alternating field which is attenuated by the flag and thus changes the quality of the coil;

preferably measurement using a wheel speed sensor:

The direction of the magnetic field of a wheel speed sensor or the flux density of the magnetic field of a switching Hall sensor with auxiliary magnets is changed by a flag, which can be registered by the sensor.

The invention also relates to the use of the sensor arrangement in motor vehicles, in particular as a torque sensor arrangement with rotational angle index detection, particularly preferably in the steering system of a motor vehicle.

The invention expediently also relates to a steering system having one of the sensor arrangements or sensor arrangement variants claimed or proposed above, the first shaft being mechanically coupled directly or indirectly to a drive unit, in particular an electric motor or a hydraulic servo unit, such that the drive unit can cause a rotational movement of the first shaft, the sensor arrangement comprising an angle sensor which detects the rotational angle of the drive shaft of the drive unit as a second shaft, the angle sensor and the drive unit being designed, in particular, in such a manner that the angle sensor can absolutely detect the rotational angle of the second shaft within one revolution.

BRIEF DESCRIPTION OF THE DRAWINGS

The invention is best understood from the following detailed description when read in connection with the accompanying drawings. Included in the drawings is the following figures:

FIGS. 6 to 8 show alternative exemplary embodiments comprising the torque sensor from FIG. 4 with respective alternative rotational angle index units, FIG. 9 shows a sensor arrangement comprising a torque sensor, which detects a torque on a rigid shaft, and a rotational angle index unit comprising an RFID, FIG. 10 shows an exemplary sensor arrangement which uses RFID technology both to transmit torque information and to transmit index information.

DETAILED DESCRIPTION OF THE PREFERRED EMBODIMENTS

Figure 1:
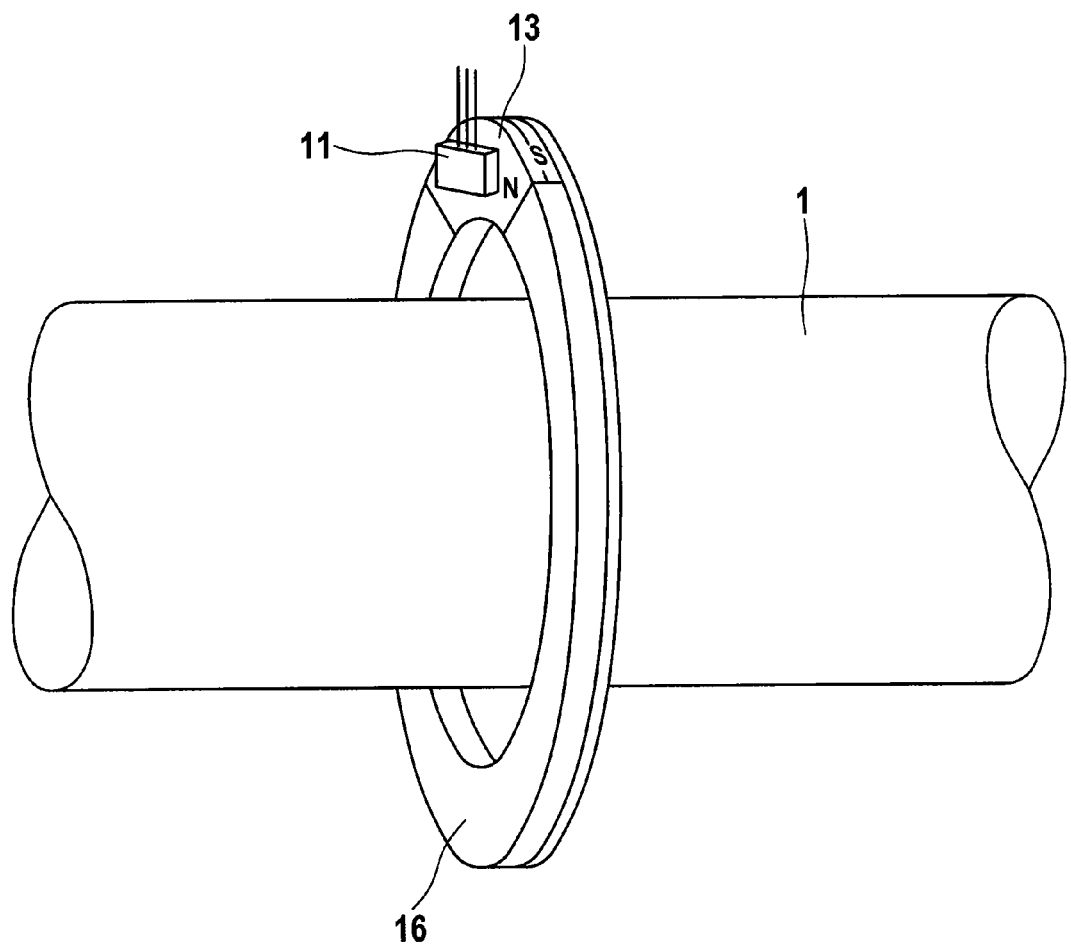
FIGS. 1, 2 show exemplary rotational angle index units.

FIG. 1 shows a first shaft 1 to which an index encoder element 13 is fastened using a carrier element 16. A first magnetic field sensor element 11 detects, for example, the magnetic field and thus the position relative to the index encoder element 13 by detecting whether or not the detection range of the magnetic field sensor element 11 and the range of the index encoder element 13 overlap.

Figure 2:
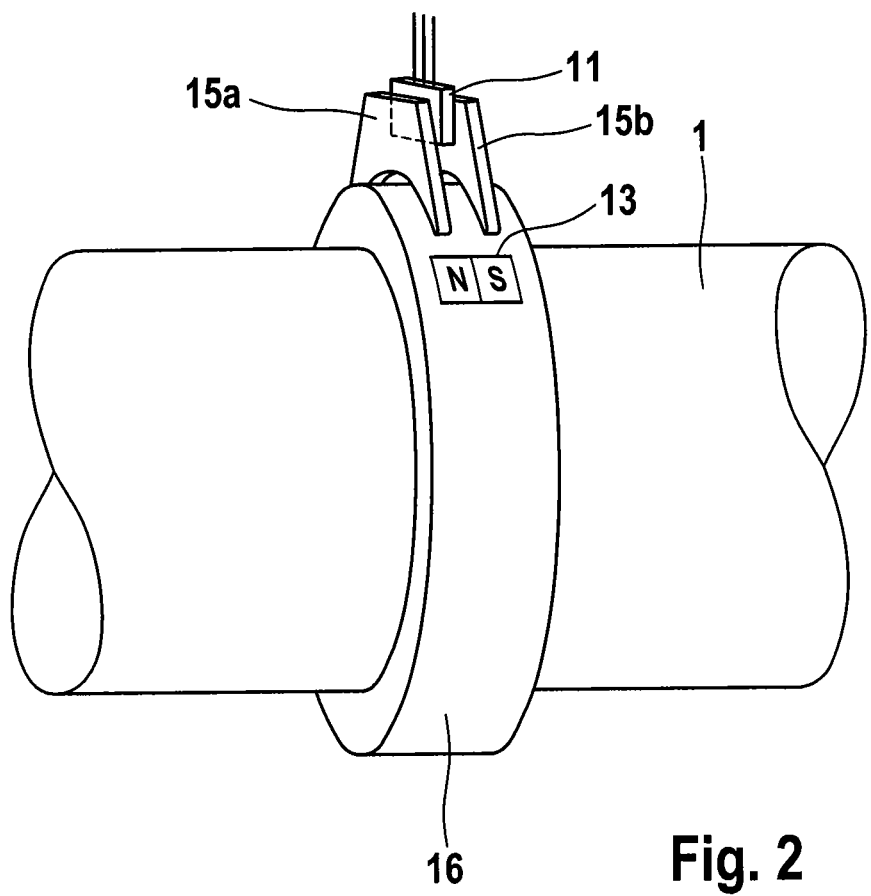

In FIG. 2, the index encoder element 13 is fastened to the first shaft 1 as a dipole magnet, for example using a carrier element 16. Two baffles 15a, 15b are contactlessly assigned to the index encoder element 13. These baffles 15a, 15b supply the magnetic field of the index encoder element 13 to the first magnetic field sensor element 11 given a suitable relative position. The index encoder element 13 therefore needs to generate only a magnetic field with a relatively low flux density.

Figure 3:
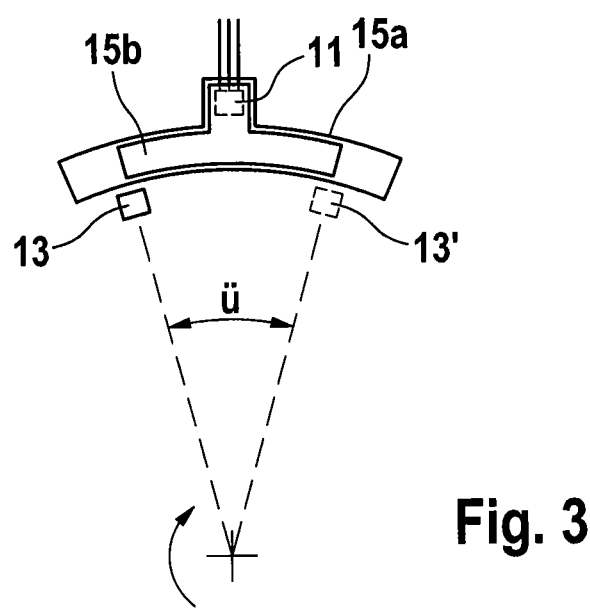
FIG. 3 shows the overlapping area between the baffles and the index encoder element.

FIG. 3 illustrates, by way of example, the overlapping area u between the index encoder element 13 and 13', for example in the form of a permanent magnet, and the baffles 15a and 15b which are assigned to the first magnetic field sensor element 11. In this case, the baffle 15a is larger and covers a larger angle range than the baffle 15b. In the overlapping area ü, the first magnetic field sensor element 11 detects the index encoder element 13 and 13'. The larger design of the baffle 15a is used to shield other sensor arrangement modules, in particular the torque sensor, from the magnetic field of the index encoder element 13.

Figure 4:
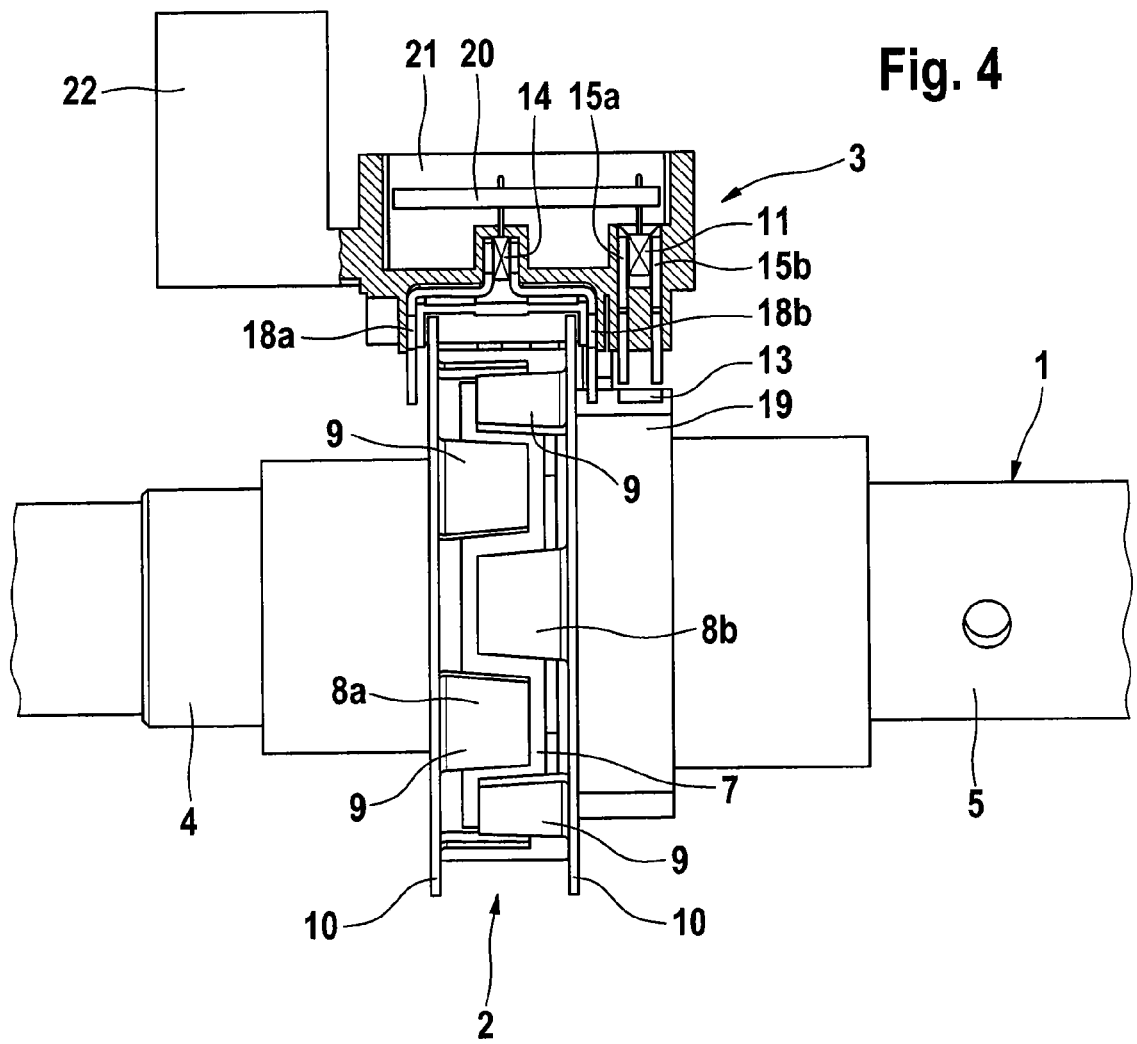
FIG. 4 shows an exemplary sensor arrangement comprising a rotational angle index unit and a torque sensor with stator elements whose fingers are assigned to a magnetic encoder.

FIG. 4 shows an exemplary embodiment of a sensor arrangement having a torque sensor 2 comprising an alternately magnetized encoder 7, two stator elements 8a, 8b, metal collecting sheets 18a, 18b assigned to the latter, and a second magnetic field sensor element 14 which is used to detect the magnetic field of the magnetic encoder 7, which field is modulated by the stator elements 8a, 8b on the basis of a torque acting on the first shaft 1. The stator elements 8a, 8b are each formed from magnetically conductive material, as are the metal collecting sheets 18a, 18b, the stator elements 8a, 8b each having a ring element 10 and trapezoidal fingers 9 which project from the ring elements axially with respect to the first shaft 1 and are designed and arranged such that they face one another and engage in one another. The sensor arrangement also comprises a rotational angle index unit 3 which forms a common integrated subassembly with the torque sensor 2. The rotational angle index unit 3 comprises an index encoder element 13 which is in the form of a permanent magnet and is arranged on a collar 19 of one of the stator elements 8b. The baffles 15a, 15b supply the magnetic field of the index encoder element 13 in the form of a dipole magnet to the first magnetic field sensor element 11. The first magnetic field sensor element 11 and the second magnetic field sensor element 14 are arranged on a common electronic printed circuit board 20. The sensor arrangement has a common housing 21, for example formed from plastic, in which a connector 22 is integrated. The first shaft comprises, for example, a first shaft section 4 and a second shaft section 5 which are connected to one another using a torsion bar (not illustrated). In this case, the magnetic encoder 7 is arranged, for example, on the first shaft section 4 and the stator elements 8a, 8b are arranged on the second shaft section 5. The rotational angle index unit 3 is likewise arranged on the second shaft section 5.

In an alternative exemplary embodiment (not illustrated) of the above sensor arrangement, the rotational angle index unit is designed in such a manner that it does not comprise any baffles and, instead, the index sensor element and the index encoder element are at a considerably shorter distance from one another. In an exemplary embodiment (not illustrated), this is achieved by virtue of the annular index encoder element having a considerably larger outer radius than in FIG. 4 and thus projecting directly as far as the first magnetic field sensor element or the index sensor element apart from a relatively small air gap.

Figure 5:
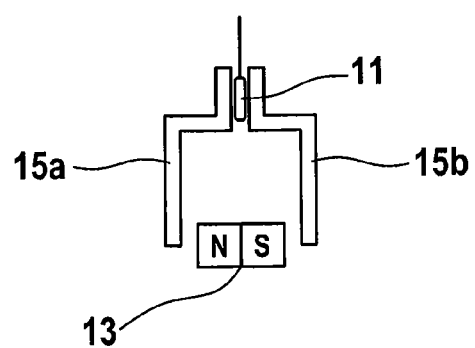
FIG. 5 shows an alternative arrangement of the baffles relative to the index encoder element.

FIG. 5 illustrates an alternative exemplary embodiment of the arrangement of the index encoder element 13 in the form of a dipole magnet relative to the baffles 15a, 15b and to the first magnetic field sensor element 11. The baffles 15a, 15b are assigned to the index encoder element 13 mainly to the side, rather than at the front.

Figure 6:
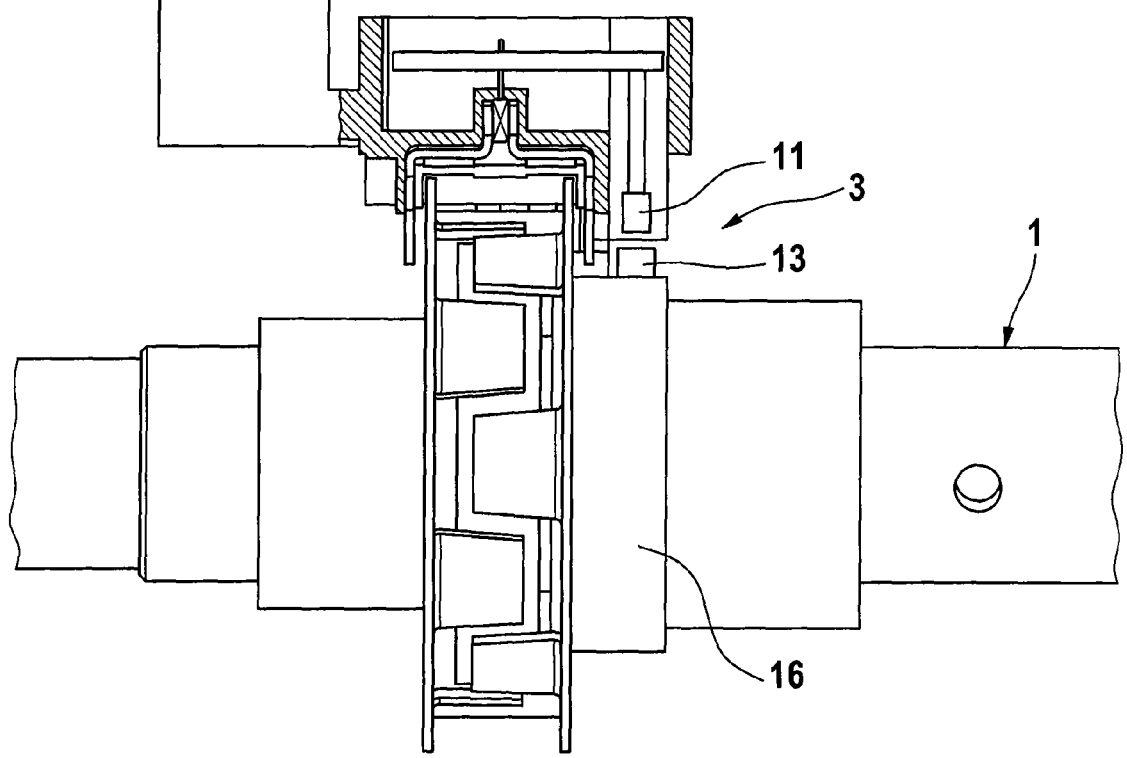

FIG. 6 shows an exemplary sensor arrangement having an alternative rotational angle index unit 3 in which the first sensor element or index sensor element 11 is in the form of a coil through which alternating current flows and which is accordingly excited and is assigned an index encoder element 13 which is arranged on a carrier element 16 on the first shaft 1, for example in the form of a steel cam. In this case, the first sensor element 11 detects the changing magnetic conductivity of the magnetic circuit of said shaft when the steel cam 13 is arranged opposite the sensor element in comparison to when the steel cam 13 has been rotated away.

In an exemplary embodiment (not additionally illustrated), the index encoder element is in the form of an electrically conductive finger or segment or lug in which the coil 11 generates eddy currents which electrically influence the coil 11 again when positioned opposite or induce a voltage in the coil 11, as a result of which an arrangement opposite one another or accordingly defined relative positioning between the coil 11 and the finger 13 is identified as a defined rotational angle or rotational angle range. The combination of the torque sensor with this rotational angle index unit based on an eddy current sensor unit is advantageous on account of the negligible mutual influencing caused by the large frequency differences of the electromagnetic fields.

Figure 7A:
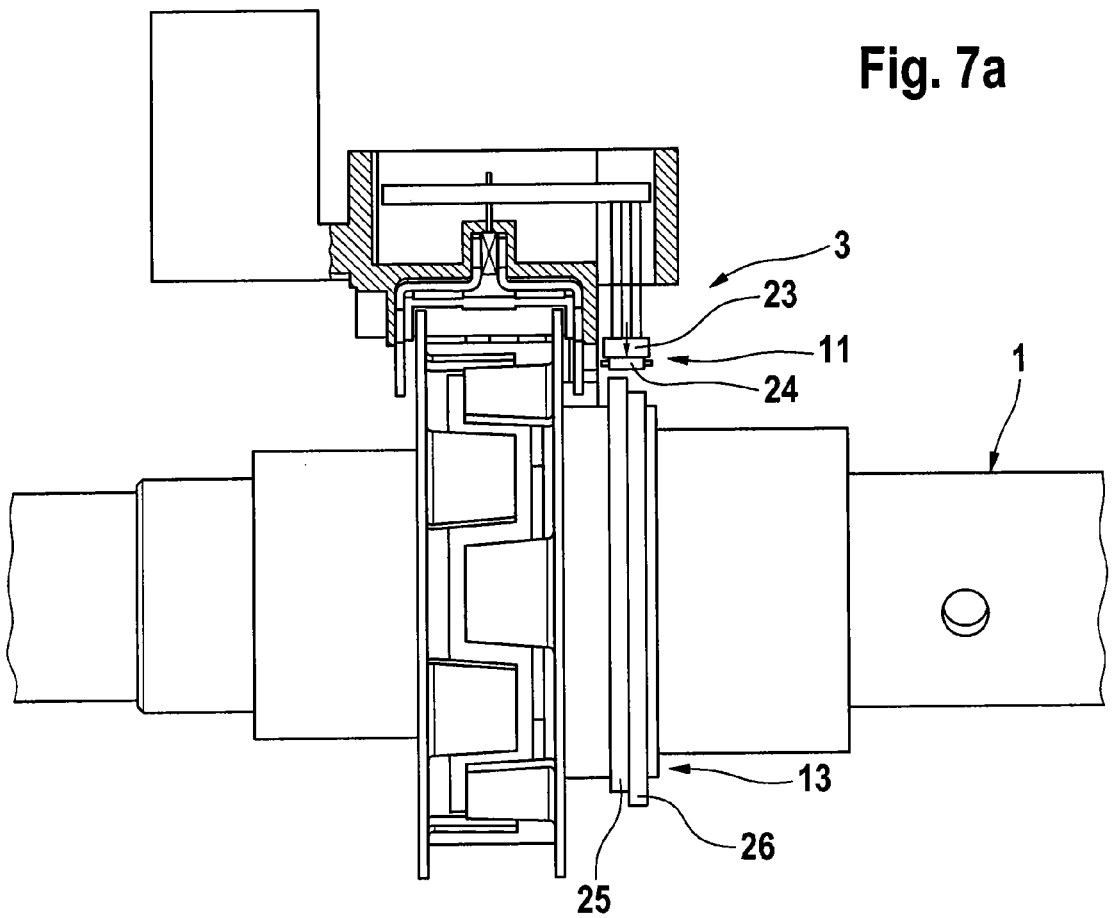
Figure 7B:
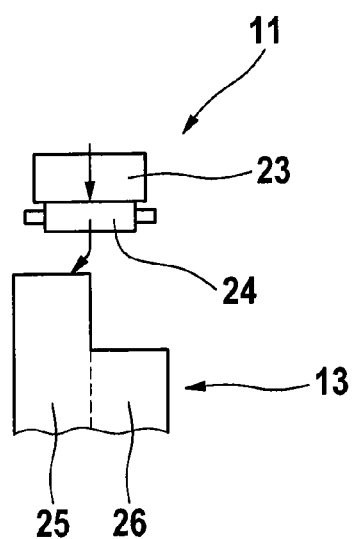
Figure 7C:
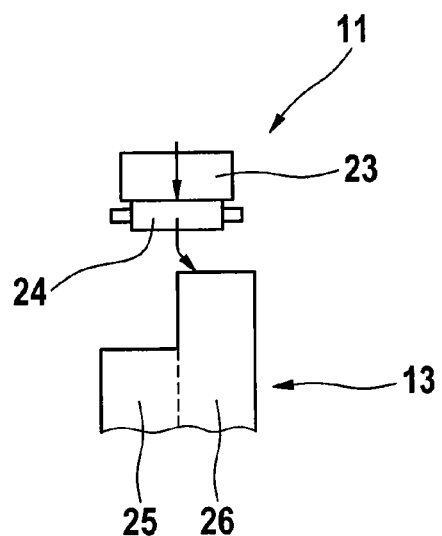

In FIGS. 7A-7C (referred to as FIG. 7 collectively), an exemplary rotational angle index unit 3 is integrated with the torque sensor already described using FIG. 4 to form a common subassembly which comprises, as a first sensor unit or index sensor unit 11, a wheel speed sensor having a permanent magnet 23 with magnetization in the direction of the arrow as well as a magnetoresistive sensor element 24. In this case, the index sensor unit 11 is assigned an annular index encoder element 13 which is arranged on a first shaft 1, is formed from magnetically conductive material and has two links 25, 26, the formation and orientation of said links and the magnetic field profile influenced by said links being illustrated in FIGS. 7B and 7C. Depending on the formation of the links 25, 26 relative to one another, the magnetic field is deflected to the right or left, which is detected by the sensor element 24. The defined rotational angle range of the rotational angle index unit is coded, for example, by a formation of the links 25, 26 relative to one another according to FIG. 7B, the other region of these links 25, 26 of the annular index encoder element 13 being formed around the first shaft 1 with respect to a circumferential line according to FIG. 7B.

FIGS. 8A-8C (referred to as FIG. 8 collectively) illustrate an alternative exemplary rotational angle index unit 3 which is integrated with the torque sensor already described using FIG. 4 to form a common subassembly, the first sensor unit or index sensor unit 11 of which comprises a magnetic field sensor element comprising a few sensitive structures 27 which are oriented differently with respect to one another. These are essentially formed or arranged along the detection direction or the tangential direction of movement of the annular index encoder element 13 within the magnetic field sensor element. The orientation of these sensitive structures, that is to say their sensitive detection direction, is illustrated by the bars crossing these structures. Along its encoder track which is illustrated in unwound form in FIG. 8B, the index encoder element 13 has magnetic pole pairs, each of a defined identical length, with the exception of the pole length of the index segment 17. The resultant amplitude A of the output signal from the magnetic field sensor element is illustrated using FIG. 8C. The index segment 17 and thus the defined rotational angle or rotational angle range are identified by means of a considerably different amplitude with respect to the remaining angle range. Such an arrangement with different sensitive structures 27 has proven to be particularly robust in terms of metrology.

FIG. 9 illustrates an exemplary sensor arrangement comprising a torque sensor, which detects a torque on a rigid shaft, as the first shaft 1, and a rotational angle index unit comprising an RFID. In order to detect the torque, the first shaft 1 does not have a torsion bar, for example, but rather the torque acting on the shaft is measured using a sensor element integrated in an RFID chip 29 which is arranged on a sensor carrier module 28 which enables simplified mounting on the shaft. The sensor carrier module 28 is arranged in a recess in the shaft and is fitted into the shaft. The sensor carrier module 28 is designed, for example, in such a manner that it wirelessly receives its electrical supply energy and wirelessly sends or transmits information. In this case, the RFID chip 29 comprises the sensor element of the torque sensor, the index encoder element and an electronic signal processing circuit. Electrical energy is supplied and torque information is transmitted using a first antenna 30, the rotational angle index unit, as an index sensor element, having an additional, second antenna 31. The index information between the RFID chip 29 and the second antenna 31 is wirelessly transmitted at a considerably different frequency, the components required for this purpose being appropriately designed.

The exemplary embodiment described using FIG. 9 was developed further by way of example, as shown in FIGS. 10A and 10B (referred to as FIG. 10 collectively). FIG. 10A illustrates two crown antennas 32a, 32b, one of which 32b is connected to the RFID chip 29 on the sensor carrier module 28 which is fitted into the first shaft 1. These crown antennas are used to supply the electrical energy for the RFID chip 20 and to transmit torque information. In this sensor arrangement, the rotational angle index unit comprises the two crown antennas, one antenna 32b acting as the index encoder element and the other antenna 32a acting as the index sensor element by virtue of both crown antennas being of essentially the same geometrical design and having a gap 33 and by virtue of the defined rotational angle or rotational angle range being identified or detected when the two gaps are opposite one another. This reduces the coupling, which can be determined using the output signal amplitude, as illustrated in FIG. 10B.

The two crown antennas 32a, 32b are designed and arranged, for example, in such a manner that they engage around the first shaft 1 and have one or more turns which are essentially geometrically congruent and are in the form of an annular segment or horseshoe in this case and each have a defined gap 33.

Figure 11:
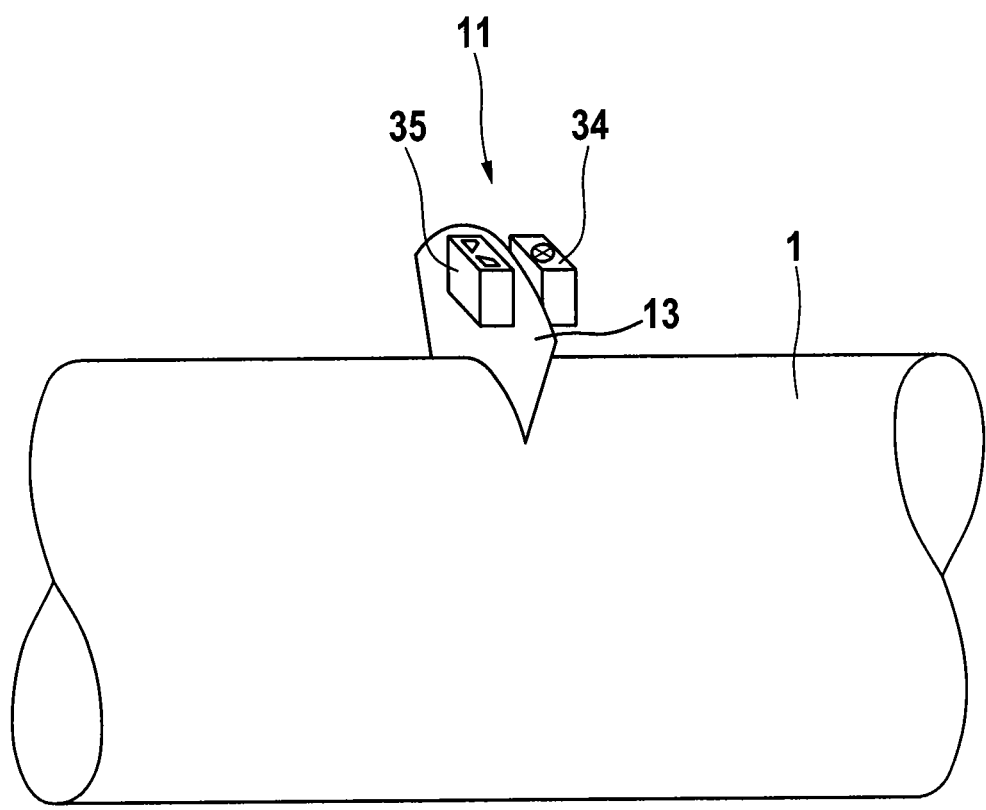
FIG. 11 shows an alternative exemplary embodiment of a rotational angle index unit with an optical forked light barrier.

FIG. 11 shows an alternative exemplary embodiment of a rotational angle index unit which has, as an index encoder element, an optically detectable lug 13 which is arranged on a first shaft and is detected using a forked light barrier as the index sensor element 11. In this case, this forked light barrier has an optical transmitting unit 34 which alternatively emits, for example, visible or invisible electromagnetic waves which are detected by an optical sensor unit 35; the lug 13 is also arranged between the transmitting unit 34 and the sensor unit 35, which identifies the defined angle or angle range or index/index range.

The invention claimed is:

1. A sensor arrangement comprising a circuit board, a torque sensor for measuring the torque acting on a first shaft, and a rotational angle index unit which is configured to detect or identify an angular position of the first shaft with respect to a defined rotational angle or defined rotational angle range,
wherein one of the torque sensor and the rotational angle index unit uses a magnetic detection principle, and the other one of the torque sensor and the rotational angle index unit uses a non-magnetic detection principle, and
wherein at least one sensor element of the torque sensor and a sensor of the rotational angle index unit are both mounted on the circuit board.

2. The sensor arrangement as claimed in claim 1, wherein the torque sensor and the rotational angle index unit are integrated in a common subassembly.

3. The sensor arrangement as claimed in claim 1, wherein the torque sensor comprises a first shaft section and a second shaft section of the first shaft, both of which sections are connected to one another using a torsion bar and are configured and arranged to rotate with respect to one another, wherein a magnetic encoder is arranged on the first shaft section and two stator elements, which are assigned to the encoder and have respective projecting fingers, are arranged on the second shaft section.

4. The sensor arrangement as claimed in claim 3, wherein the stator elements each comprise a soft magnetic ring element having fingers which project axially with respect to the first shaft and wherein the fingers of the two stator elements contactlessly engage in one another, and at least one magnetic field sensor element being jointly assigned to the stator elements, which magnetic field sensor is used to directly or indirectly detect the relative angle of rotation between the first shaft section and the second shaft section, the torque acting on the first shaft being inferred from said angle.

5. The sensor arrangement as claimed in claim 1, wherein the torque sensor does not comprise a torsion bar, the torque sensor having at least one of the following sensor elements:
 (a) a strain gage,
 (b) a piezoelectric or piezoresistive sensor element,
 (c) a magnetostrictive sensor element, and
 (d) a sensor element based on the use of surface waves,
wherein the sensor element is directly or indirectly connected to the first shaft or being configured and arranged to detect a torque acting on the first shaft.

6. The sensor arrangement as claimed in claim 1, wherein the rotational angle index unit has an index encoder element and an index sensor element which is assigned to the latter, the index encoder element or the index sensor element being directly or indirectly connected to the first shaft and rotating with the first shaft and the corresponding index sensor element or index encoder element being arranged in a stationary, contactless manner with respect to the first shaft.

7. The sensor arrangement as claimed in claim 6, wherein the index encoder element is magnetically or optically detectable or electrically conductive, and wherein the index sensor element comprises at least one magnetic field sensor element or a coil or an optical sensor element.

8. The sensor arrangement as claimed in claim 6, wherein the index encoder element is a magnetic encoder and the rotational angle index unit has two magnetically conductive baffles which supply a magnetic field generated or modulated by the index encoder element to the index sensor element, and wherein the index sensor element is configured to detect the index encoder element with respect to a detectable length of the index encoder element and a length of the baffles based on a respective circumferential line.

9. The use of the sensor arrangement as claimed in claim 1 in motor vehicles.

* * * * *

UNITED STATES PATENT AND TRADEMARK OFFICE
CERTIFICATE OF CORRECTION

PATENT NO. : 8,607,650 B2  
APPLICATION NO. : 13/003419  
DATED : December 17, 2013  
INVENTOR(S) : Antoni et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 302 days.

Signed and Sealed this
Twenty-second Day of September, 2015

Michelle K. Lee
*Director of the United States Patent and Trademark Office*